United States Patent
Khan et al.

(10) Patent No.: US 12,141,152 B2
(45) Date of Patent: Nov. 12, 2024

(54) USER-DRIVEN DYNAMIC SYSTEM MANAGEMENT SEARCH

(71) Applicant: Dell Products L.P., Round Rock, TX (US)

(72) Inventors: Zoheb Khan, Austin, TX (US); Nitesh Kumar Anand, Round Rock, TX (US); Vijayasimha Reddy Naga, Georgetown, TX (US); Sudhir Shetty, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/395,550

(22) Filed: Aug. 6, 2021

(65) Prior Publication Data

US 2023/0044316 A1    Feb. 9, 2023

(51) Int. Cl.
*G06F 16/2457*    (2019.01)
*G06F 16/9535*    (2019.01)

(52) U.S. Cl.
CPC .... *G06F 16/24578* (2019.01); *G06F 16/9535* (2019.01)

(58) Field of Classification Search
CPC ............ G06F 16/24578; G06F 16/9535
See application file for complete search history.

(56) References Cited

U.S. PATENT DOCUMENTS

| | | | | |
|---|---|---|---|---|
| 6,144,959 A | * | 11/2000 | Anderson | G06F 21/31 709/224 |
| 6,311,178 B1 | * | 10/2001 | Bi | G06Q 30/06 707/948 |
| 2004/0068728 A1 | * | 4/2004 | Blevins | G06F 9/546 718/100 |
| 2004/0225953 A1 | * | 11/2004 | Rank | G06F 40/143 715/234 |
| 2011/0112922 A1 | * | 5/2011 | Smith | G06Q 30/06 705/26.2 |
| 2012/0130858 A1 | * | 5/2012 | Kiss | G06Q 30/06 707/723 |
| 2013/0054558 A1 | * | 2/2013 | Raza | G06Q 50/01 707/769 |
| 2014/0067795 A1 | * | 3/2014 | Ullman | G06F 16/9535 707/722 |
| 2017/0052978 A1 | | 2/2017 | Gupta et al. | |
| 2018/0181378 A1 | * | 6/2018 | Bakman | G06F 8/38 |
| 2019/0108275 A1 | * | 4/2019 | Gulli | G06F 16/335 |
| 2021/0168046 A1 | | 6/2021 | Madala et al. | |

* cited by examiner

*Primary Examiner* — Mark D Featherstone
*Assistant Examiner* — Brooks T Hale
(74) *Attorney, Agent, or Firm* — Larson Newman, LLP

(57) ABSTRACT

An information handling system includes first and second memories, and a processor. The first memory stores user settings for performing a search in a system management console. The second memory stores data associated with components of the system management console. The processor receives multiple user defined weights, and each of the user defined weights is associated with a different search criterion of multiple search criteria. Based on the received user defined weights, the processor determines updated weights for each of the search criteria. The processor stores the updated weights for each of the search criteria in the user setting of the first memory. The processor receives a search query, and provides search results based on the search query and the updated weights for each of the search criteria. The search results include data from the second memory.

15 Claims, 7 Drawing Sheets

USER-DRIVEN DYNAMIC SYSTEM MANAGEMENT SEARCH

FIELD OF THE DISCLOSURE

The present disclosure generally relates to user-driven dynamic system management search in an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes first and second memories, and a processor. The first memory may store user settings for performing a search in a system management console. The second memory may store data associated with components of the system management console. The processor may receive multiple user defined weights, and each of the user defined weights is associated with a different search criterion of multiple search criteria. Based on the received user defined weights, the processor may determine updated weights for each of the search criteria. The processor may store the updated weights for each of the search criteria in the user setting of the first memory. The processor may receive a search query, and provide search results based on the search query and the updated weights for each of the search criteria. The search results may include data from the second memory.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
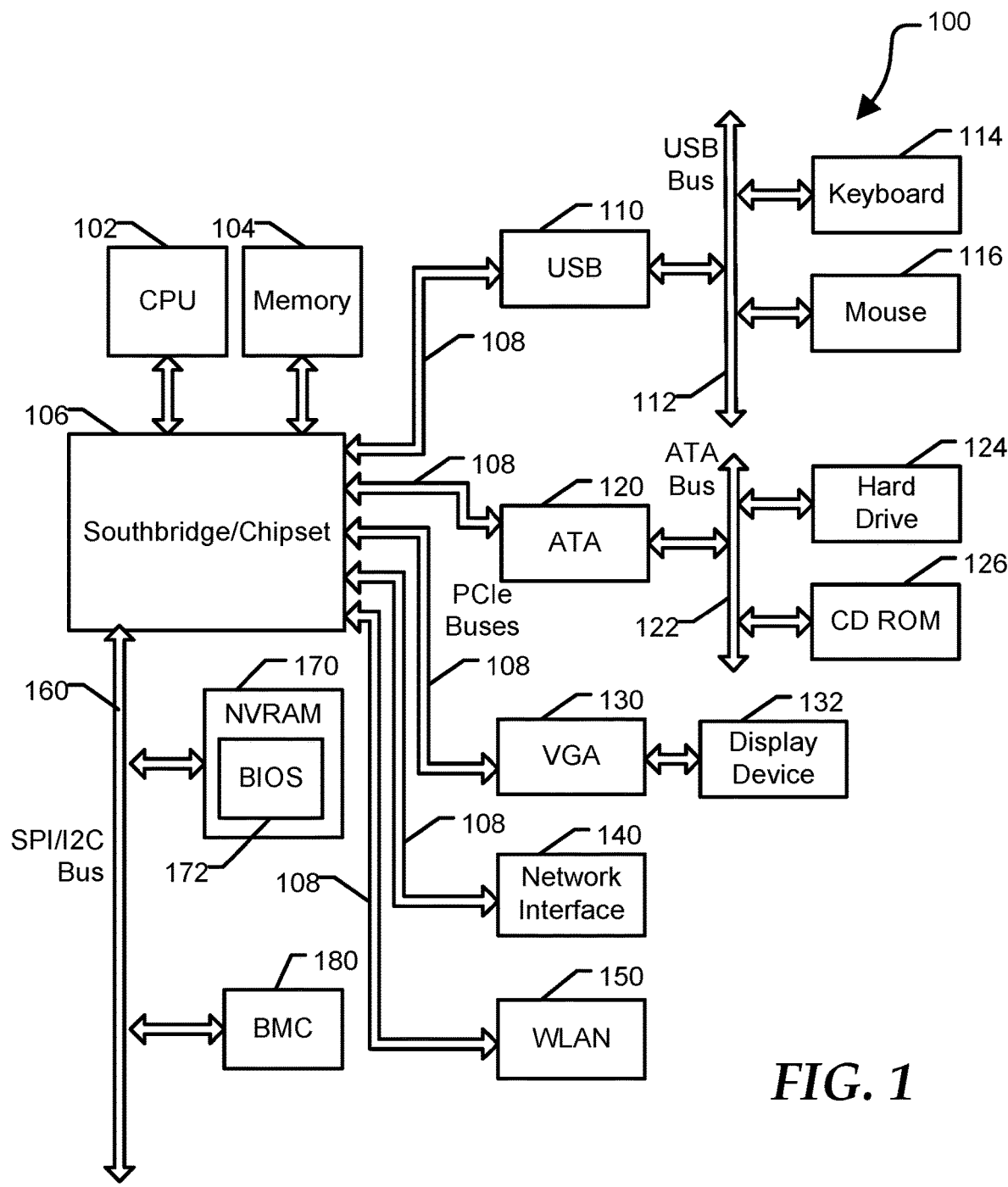
FIG. 1 is a block diagram of a general information handling system according to an embodiment of the present disclosure.

FIG. 1 illustrates a general information handling system 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more busses operable to transmit communications between the various hardware components.

Information handling system 100 including a processor 102, a memory 104, a southbridge/chipset 106, one or more PCIe buses 108, a universal serial bus (USB) controller 110, a USB 112, a keyboard device controller 114, a mouse device controller 116, a configuration an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a NVRAM 170 for storing BIOS 172, and a baseboard management controller (BMC) 180. In an example, chipset 106 may be directly connected to an individual end point via a PCIe root port within the chipset and a point-to-point topology as shown in FIG. 1. BMC 180 can be referred to as a service processor or embedded controller (EC). Capabilities and functions provided by BMC 180 can vary considerably based on the type of information handling system. For example, the term baseboard management system is often used to describe an embedded processor included at a server, while an embedded controller is more likely to be found in a consumer-level device. As disclosed herein, BMC 180 represents a processing device different from CPU 102, which provides various management functions for information handling system 100. For example, an embedded controller may be responsible for power management, cooling management, and the like. An embedded controller included at a data storage system can be referred to as a storage enclosure processor.

System 100 can include additional processors that are configured to provide localized or specific control functions, such as a battery management controller. Bus 160 can include one or more busses, including a SPI bus, an I2C bus, a system management bus (SMBUS), a power management bus (PMBUS), and the like. BMC 180 can be configured to provide out-of-band access to devices at information handling system 100. As used herein, out-of-band access herein refers to operations performed prior to execution of BIOS 172 by processor 102 to initialize operation of system 100.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, such as a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One or more components can be integrated together. For example, portions of southbridge/chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display. An example of information handling system 100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Figure 2:
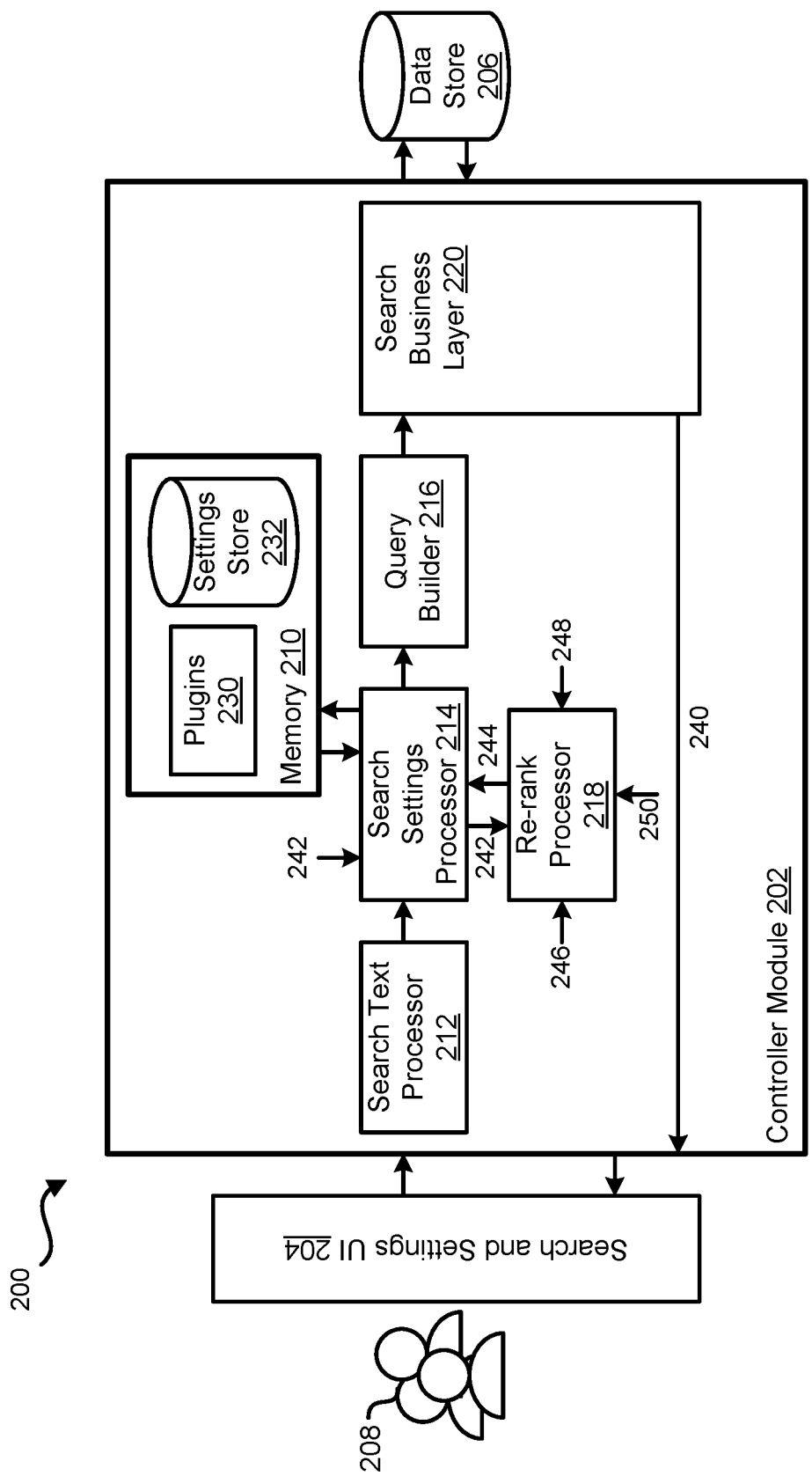
FIG. 2 is a diagram of a portion of an information handling system according to at least one embodiment of the present disclosure.

In an example, information handling system 100 may be any suitable device including, but not limited to, information handling system 200 of FIG. 2. Information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media.

FIG. 2 illustrates a portion of an information handling system 200 according to at least one embodiment of the present disclosure. Information handling system 200 includes a controller module 202, a search and settings user interface (UI) 204, and a data store 206. In an example, one or more users 208 may utilize search and settings UI 204 to manage components of information handling system 200. Controller module 202 may be any suitable component to interface with search and setting UI 204 to enable users 208 to manage the different components of information handling system 200. For example, controller module 202 may be a system management module, such as OpenManage Enterprise (OME). Controller module 202 includes any suitable components including, but not limited to, a memory 210, a search text processor 212, a search settings processor 214, a query builder 216, a re-rank processor 218, and a search business layer 220. Memory 210 may store any suitable data including, but not limited to, plugins 230 and user settings 232.

In an example, information handling system 200 may include any suitable components to be managed by controller module 202. For example, the components of information handling system 200 may include, but are not limited to, servers and power supply devices. Data store 206 may include any suitable data for the components including, but not limited to, identifiers of the components, alerts associated with the components, jobs executed by the components, users accessing the components, audit logs for the components, and links.

During operation, user 208 may provide a search query, via search and settings UI 204, to controller module 202, and the search query may request any suitable data collected in the components of information handling system 200. In previous information handling systems, the system management console delivered with the information handling system may be pre-configured, such that the manner that searches are performed and how results are provide may be set by a manufacturer and may not be re-configurable after deployment of the system management console application. In these previous information handling systems, the searching capabilities of the system management console application may cause difficulties for a user to find desired results to search queries in a quick and easy manner. Also, previous information handling systems may have limited extensibility of searching for plugins to the system management console to extend the search functionality based on the plugins. An information handling system, such as information handling systems 100 and 200, may be improved by controller module 202 enabling user 208 to update user settings, which in turn may be utilized to change how searches are performed and results are provided to the user. These user settings may enable user 208 to quickly and easily find desired search results as will be described herein.

In an example, each user 208 may have access to controller module 202 of a system management console, which in turn may provide the users with different types of access to the components of information handling system 200. In certain examples, each user 208 may have separate user login credentials, and the different credentials may grant different access, such as view data only, view data and update components, or the like. When the controller module 202 of a system management console is shipped in information handling system 200, the controller module 202 may have a standard or preset user setting stored within user settings data store 232 of memory 210. In an example, each new user provided with access to controller module 202 may have the preset user settings stored in the settings data store 232 for that user. The preset user settings may assign an equal weight to each search criterion or search category in the system management console. In an example, the search categories may include, but are not limited to, devices, users, jobs, alerts, links, alert policies, and audit logs.

During a search query, user 208 may provide text for the search to controller module 202 via search and settings UI 204. Search text processor 212 may parse the search query and provide the parsed query to search settings processor 214. In response to the parsed query, search settings processor 214 may retrieve user settings for user 208 from settings data store 232 and may provide the parsed query and user settings to query builder 216. In an example, query builder 216 may generate the search parameters for the query based on the parsed query and the user settings. Query builder 216 may then provide the search parameters to search business layer 218. In an example, search business layer 218 may include any suitable components to perform a search of data in data store 206 based on the received search parameters. In certain examples, search business layer 218 may include a request validator, an entity mapper, a request builder, and a response processor. In these examples, the different components of search business layer 218 may perform the search based on the received search parameters and return search results 240. If each user 208 maintains the preset user settings as personal user settings, any search query with common search terms from the different users may produce the same search results 240 in the same order.

In an example, re-rank processor 218 of controller module 202 may perform one or more suitable operations to update user settings for each individual user 208, such that search results 240 may be adjusted based on the user providing the search query. For example, re-rank processor 218 may receive user configured weights 242 via any suitable manner, and may utilize the user configured weights to update or adjust overall search categories weights 244. In an example, user 208 may provide user configured weights 242 to search and settings processor 214 via search and settings UI 204 as will be described with respect to FIG. 3.

Figure 3:
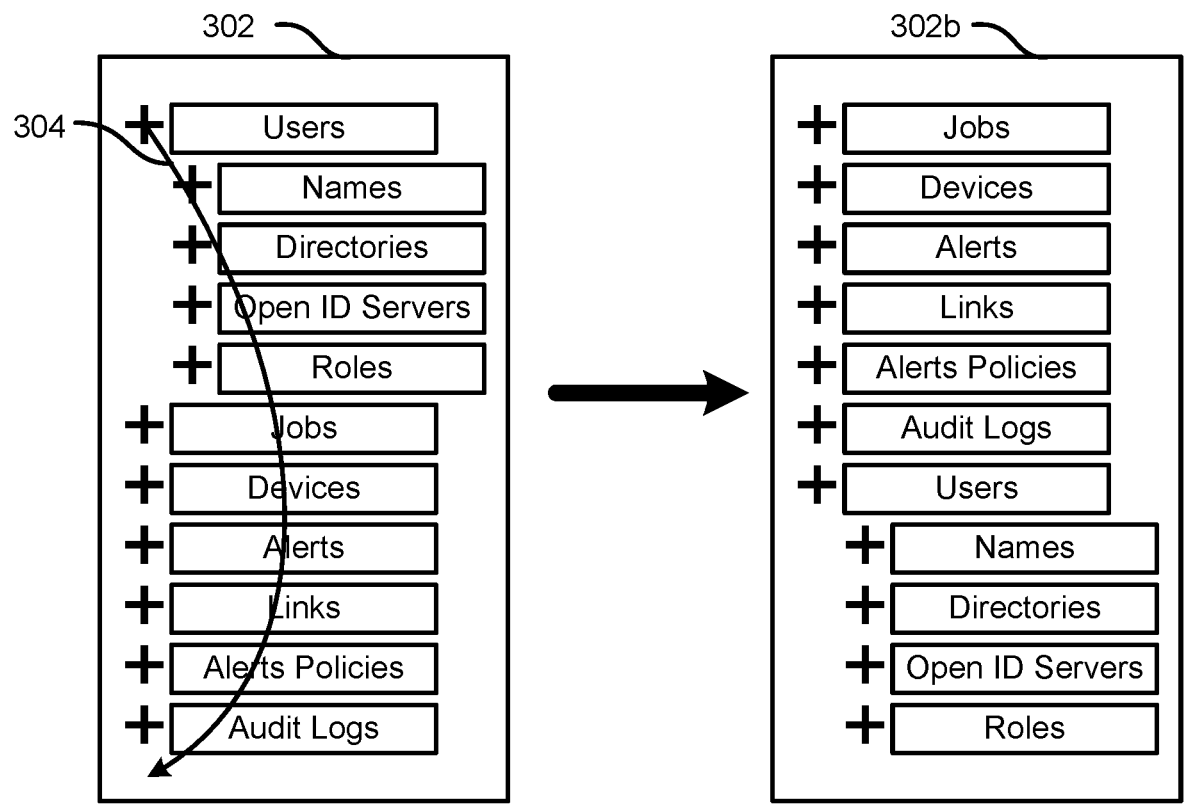
FIG. 3 is a diagram of a dynamically updated user settings in a system management console according to at least one embodiment of the present disclosure.

FIG. 3 illustrates an initial search category priority or weight list 302 and an updated search category priority or weight list 302b according to at least one embodiment of the present disclosure. Initial search category list 302 may be included in the system management console when delivered in the information handling system, such as information handling system 200 of FIG. 2. Initial search category list 302 may include any suitable search categories including, but not limited to, users, jobs, devices, alerts, links, alerts policies, and audit logs. In certain examples, one or more of the search categories may have sub-categories. For example, search category users may include sub-categories names, directories, open ID servers, and roles.

In an example, a user may utilize a search and settings UI, such as search and settings UI 204 of FIG. 2, to move the search categories based on user preferences. For example, a user may drag a search category, such as users, from one location in the initial search category list to another as indicated by arrow 304. In response to the user dragging the search category to a new location, as shown in updated search category list 302b, weights for the search categories may be adjusted according. For example, the user search category may be moved from the top of the search category list to the bottom. Based on this move, a weight associated with the users search category may be decreased. In an example, the weight for the other categories that moved up in the list may be increased.

Referring back to FIG. 2, search and settings processor 214 may provide user configured weights 242 to re-rank processor 218, which in turn may provide the updated or adjusted weights 244 to the search settings processor. In an example, search settings processor 214 store the updated weights in a user setting associated with user 208 in settings data store 232. In certain examples, search settings processor 214 may parse the next search query provided by user 208 based on updated weights 244.

Re-rank processor 218 may further updated weights 244 for search categories based on any other suitable data collected during a current session of user 208. For example, re-rank processor 218 may receive a browsing history 246, time tracking data 248, and adjusted search results 250. In an example, re-ranking processor 218 may generate updated weights based on browsing history 246 and time tracking data 248. For example, during a current session of user 208, browsing history 246 may indicate one or more webpages within the system management console that the user visited. Re-rank processor 218 may increase a weight for search categories associated with these pages and may provide these updated weights 244 to settings data store 232.

During a current session of user 208, re-rank processor 218 may determine that the user has spend a lot of time browsing particular content 248, such as security information, alerts or the like, and re-rank processor 218 may utilize the time spent on particular content to update the weights of the search categories. For example, the longer user 208 spends looking at particular content, time spent 248 for an associated category is increased. Re-rank processor 218 may increase a weight for search categories associated with higher amounts of time spent 248 and may provide these updated weights 244 to settings data store 232.

During a current session of user 208, re-rank processor 218 may determine a search results adjustment 250, and re-rank processor 218 may update the weights of the search categories based on the search results adjustment. For example, search results 240 may be provide in a particular priority order, but user 208 may utilize search and settings UI 204 to move the search results around and thereby adjust the priority of the search results as will be described with respect to FIG. 4.

Figure 4:
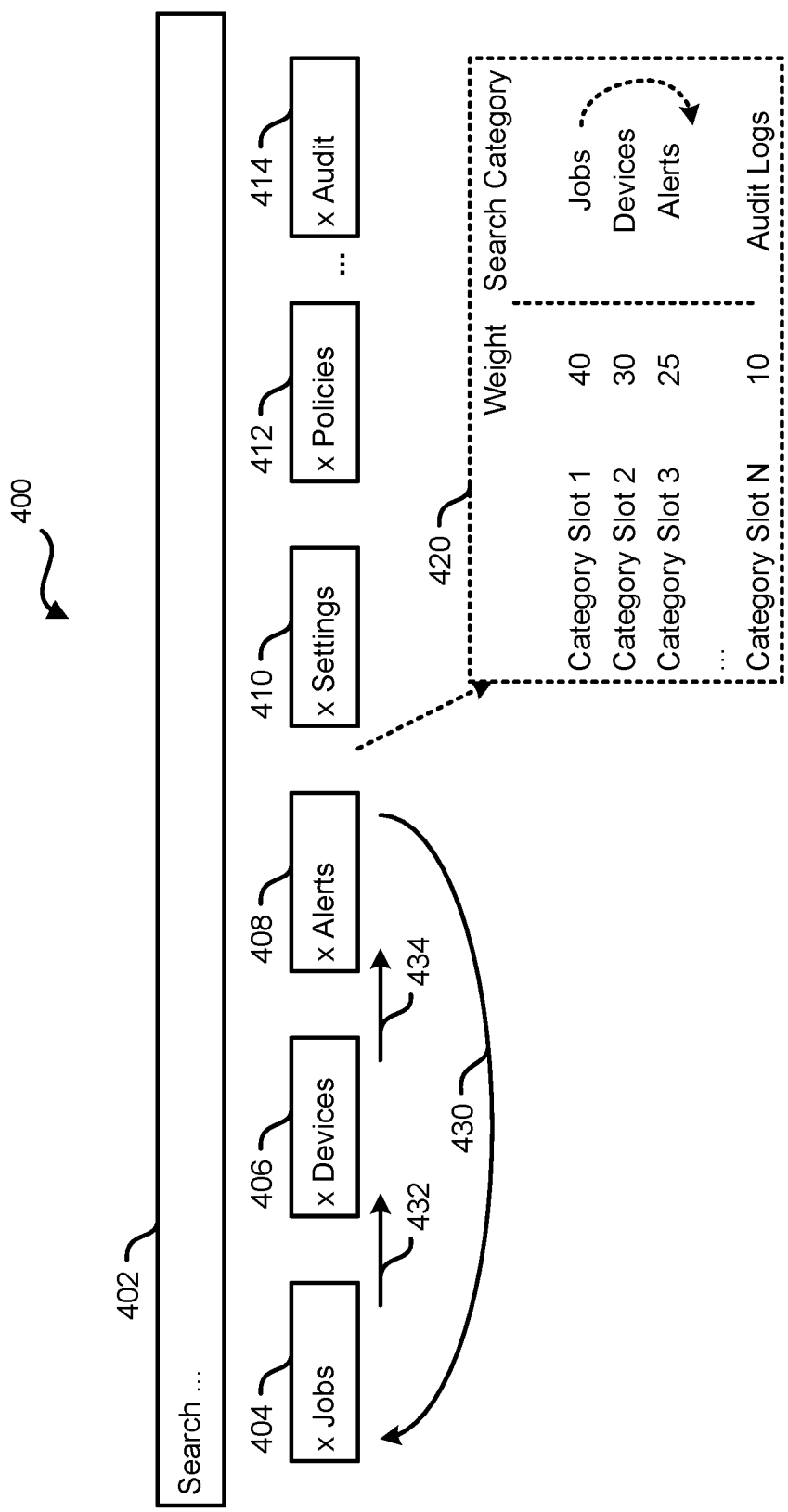
FIG. 4 is a diagram of user-driven rank update of categories in a search result according to at least one embodiment of the present disclosure.

FIG. 4 a search result 400 according to at least one embodiment of the present disclosure. In an example, search result 400 may be substantially similar to search result 240 of FIG. 2. Search result 400 includes a search text box 402, a multiple category results 404, 406, 408, 410, 412, and 414. In an example, a user may provide a search query in text box 402, and a system management console may perform the search as described above with respect to FIG. 2. In response to the search being completed, search result 400 may be provided to a user in any suitable manner. In an example, the search categories may be listed according to a weight determined or assigned prior to the search.

Weight table 420 may illustrate a weight associated with each category and the corresponding category slot in search results 400. For example, jobs category may be associated with the category slot 1 and given a weight of 40 as shown in weight table 420. Based on the information in weight table 420, data associated with the jobs category may be provided in first category slot 404. Similarly, devices category may be associated with the category slot 2 and given a weight of 30 as shown in weight table 420. Based on the information in weight table 420, data associated with the devices category may be provided in second category slot 406. Alerts category may be associated with the category slot 3 and given a weight of 25 as shown in weight table 420. Based on the information in weight table 420, data associated with the alerts category may be provided in third category slot 408. In an example, similar data may be stored for settings category in slot 410 and policies category in slot 412. Audit category may be associated with the category slot N and given a weight of 40 as shown in weight table 420. Based on the information in weight table 420, data associated with the alerts category may be provided in nth category slot 414.

In an example, a user may select one or more search categories to rearrange and thereby place the search results in an order that best describes the intent of the search during a particular browsing session. For example, the user may drag and drop the alerts category from slot 408 to the front of the list as shown by arrow 430. In response to the drag and drop operation of the alerts category, the jobs category in slot 404 may move down one position as indicated by arrow 432, and the devices category in slot 406 also move down one position as indicated by arrow 434. In this example, the weight assigned to the alerts category may increase, and the weights assigned to the jobs and devices categories may decrease based on the movements of the categories in search results 400.

Referring back to FIG. 2, re-rank processor 218 may update weights for search categories based on the movement of the search result in search results adjustment 250. For example, re-rank processor 218 may increase a weight for search categories associated with search results moved up in priority and decrease a weight for search categories associated with search results moved down in priority within search results adjustment 250. Re-rank processor 218 may provide these updated weights 244 to settings data store 232. In an example, updated weights 244 changed based on search result adjustments 250 may be removed from settings data store 232 at the end of a current session for user 208.

Figure 5:
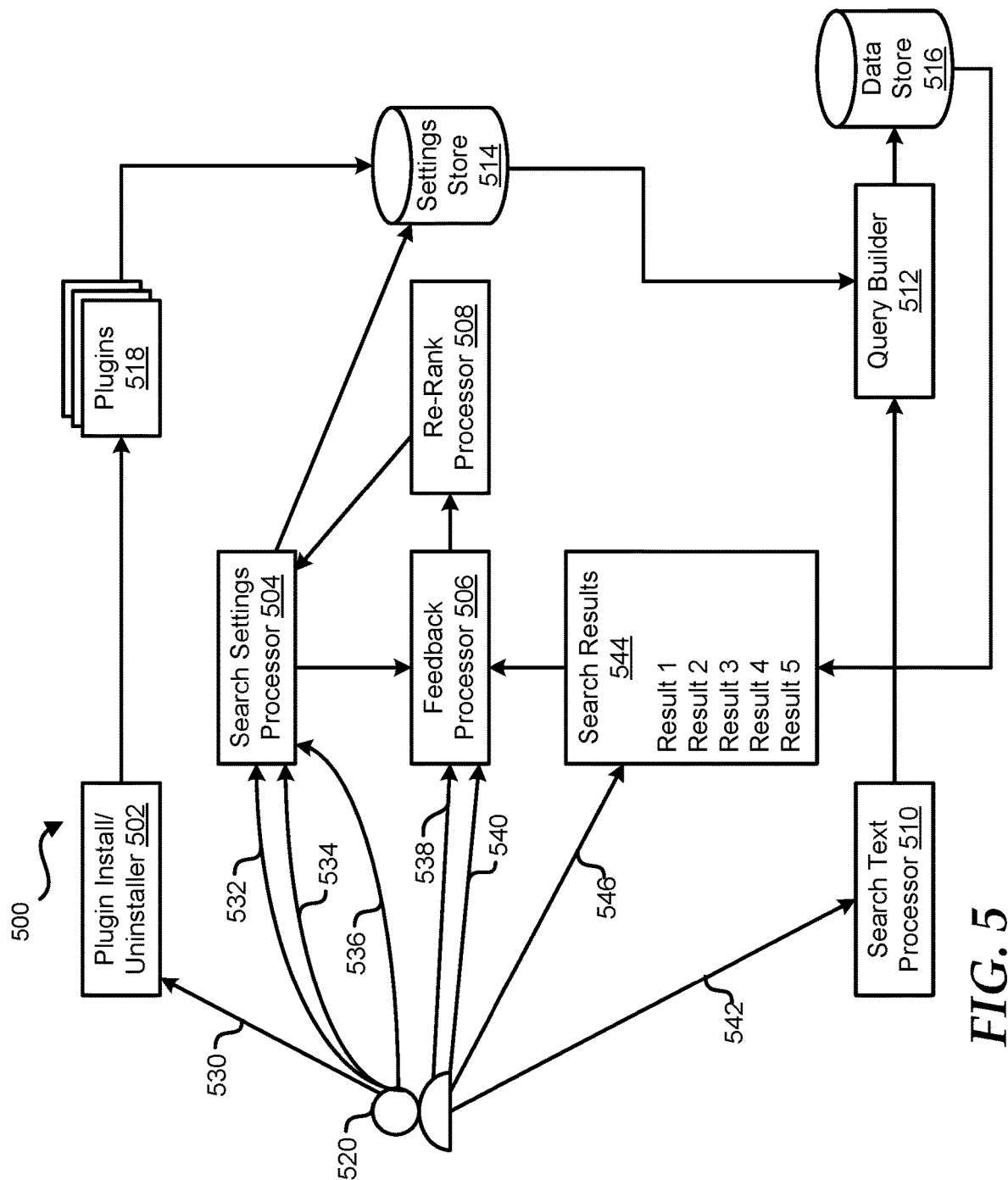
FIG. 5 is a diagram of a system management console updating weights of search categories according to at least one embodiment of the present disclosure.

FIG. 5 illustrates a flow of operations for multiple components of a system management console 500 according to at least one embodiment of the present disclosure. System management console 500 includes a plugin install/uninstaller 502, a search settings processor 504, a feedback processor 506, a re-rank processor 508, a search text processor 510, a query builder 512, a settings data store 514, a data store 516, and one or more plugins 518. A user 520 may provide, perform, select or interact with the components of system management console 500 to provide user weight preferences for search categories.

In certain examples, user 520 may provide a plugin request 530 to plugin install/uninstaller 502. In response to plugin request 530, plugin install/uninstaller 502 may install one or more requested plugins 518. In an example, the added plugins 518 may provide additional data in system management console 500 that user 520 may utilize to determine information about components in an information handling system supported by the system management console. For example, a plugin 518 may be a power management plugin, and these plugins may provide data associated with power usage in the information handling system. In this example, information associated with plugins 518 installed within the information handling system may be provided to settings data store 514, such that a search query may include searching data generated by the plugins.

In an example, user 520 may provide user weights preferences 532 for search categories in system management console 500. These user weight preferences 532 may be for any search categories listed and described herein. User 520 may also provide user tag preferences 534 to identify groups in the search categories in system management console 500. In an example, tag preferences 534 may be associated with any suitable group of devices including, but not limited to, a management scope or role of user 520 and a certain geo-location of the devices. In certain examples, user 520 may provide weights preferences 532 and tag preferences 534 in any suitable manner, such as those manners described herein. User 520 may provide user plugin preferences 536, and these preferences may be associated with one or more plugins 518. In an example, weights preferences 532, tag preferences 534, and plugin preferences 536 may be provided to search settings processor 504.

In response to receiving weights preferences 532, tag preferences 534, and plugin preferences 536, search setting processor 504 may provide these preferences to feedback processor 506. In an example, feedback processor 506 may receive a browsing history 538 and an amount of time 540 spent on the webpages. Feedback processor 506 may assign weight updates to one or more components based on browsing history 538 and amount of time 540 as described herein. Feedback processor 506 may provide the updated weights from search settings processor 504 and the updated weight calculated from browsing history 538 and amount of time 540 to re-rank processor 508.

Based on the updated weights from feedback processor 506, re-rank processor 508 may adjust or update weights for all search categories in system management console 500. For example, re-rank processor 508 may utilize user tag preferences 532 to increase the weights for device associated with a particular tag or group. In this example, re-rank processor 508 may increase weights for devices that are tagged as cluster devices, racks, or the like. Re-rank processor 508 may provide the updated search category weights to search and settings processor 504, which in turn may store updated search category weights in setting data store 514 to be utilized during a next search query from user 520.

In response to user 520 providing a search query 542, via a GUI, search text processor 510 may parse the search query and provide the parsed query to query builder 512. In an example, search text processor 510 may perform one or more suitable operations to parse search query 542. For example, search text processor 510 may utilize the management domain scope of user 520 when parsing search query 542. In an example, the management domain scope of user 520 may include any suitable information about the user, such as role based access control (RBAC), scope based access control (SBAC), and location preferences to perform the parse. In certain examples, parsing search query 542 based on RBAC and SBAC of user 520 may increase the weight of devices within the scope and role of the user. For example, if SBAC of user 520 indicates that the user has management domain over a certain percentage of devices in a particular group, search text processor 510 may indicate that only those devices should be searched.

In response to the parsed query, query builder 512 may retrieve user settings for user 520 from settings data store 514 and may generate the search parameters for the query based on the parsed query and the user settings. Query builder 512 may then perform the search on data within data store 516 and search results based on the received search parameters and return search results 544.

In an example, user 520 may perform a rearrange operation 546 on search results 544 and thereby place the search result in an order that best describes the intent of the search during a particular browsing session. For example, the user may drag and drop different results during rearrange operation 546. In response to the drag and drop operation the weight assigned to one or more categories may increase, and the weights assigned to the other categories may decrease based on the movements of the categories in search results 544. The updated weights based on rearrange operation 546 may be provided to feedback processor 506, which in turn may provide the updates to re-rank processor 508.

Figure 6:
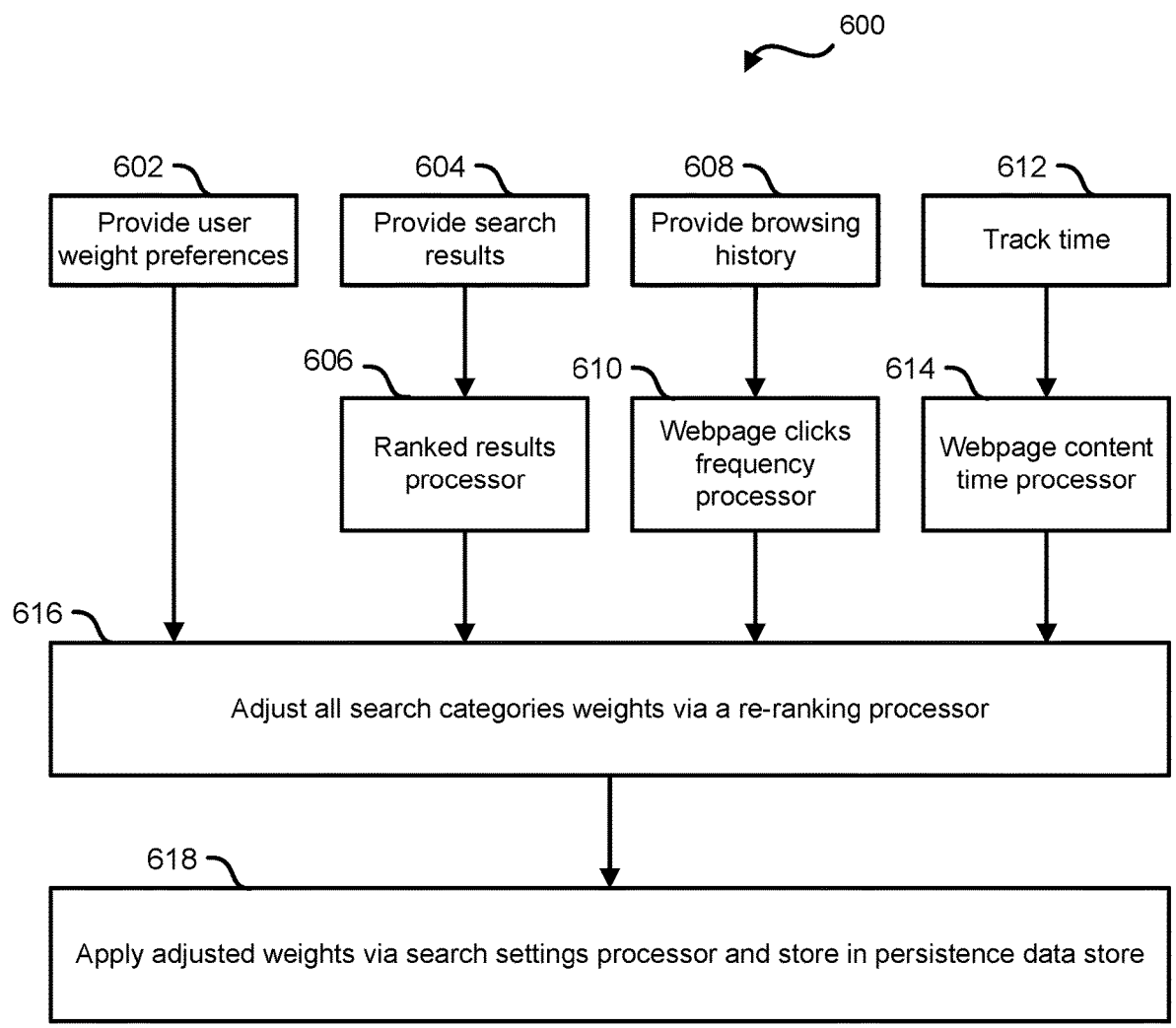
FIG. 6 is a flow diagram of a method for dynamically updating system management searches according to at least one embodiment of the present disclosure.

FIG. 6 illustrates a flow diagram of a method 600 for dynamically updating system management searches according to at least one embodiment of the present disclosure. At block 602, user weight preferences are provided. In an example, the user weight preferences may be applied to any suitable search criteria, such as search categories, search sub-categories, tags, or the like. In certain examples, the user may identify user weight preferences for categories in any suitable manner including, but not limited to, utilizing a GUI to drag and drop categories in a desired order. The user may further define weight preferences between sub-categories of a particular category, and may drag and drop the sub-categories in a similar manner as for the categories. In an example, the user may also utilize tags or groups within a category to further prioritize data. For example, a search category may be devices and the user may priority a particular group tag within devices, such as devices associated with a production group.

At block 604, search results are provided. At block 606, a ranked results processor may analyze the search results to determine whether a user has rearranged the search results. In an example, the user may utilize drag and drop operations in a GUI to rearrange the search result to identify the categories, sub-categories, or tags that the user was expecting to see as the highest priority or weight in the search results. In response to the ranked results processor determining that rearrangements of the search results have been made, the ranked results processor may provide the updated search results arrange.

At block 608, a browsing history is provided. In an example, the browsing history includes any suitable information associated with the pages that a user has visited during a current login session. At block 610, a webpage clicks frequency processor receives the browsing history and performs one or more operations. In an example, the webpage clicks frequency processor may calculate a number of times or clicks that the user has visited each individual webpage of the system management console based on the browsing history. The webpage clicks frequency processor may adjust weights for search categories based on the number of times associated webpages have been visited.

At block 612, an amount of time the user spends on each webpage is tracked. At block 614, the tracked time is provided to a webpage content time processor. In an example, the webpage content time processor may adjust weights for search categories based on the amount of time the user spends on webpages associated with the search categories. In certain examples, blocks 602, 604, 608, and 612 may be performed substantially in parallel, and blocks 606, 610, and 614 may be performed substantially in parallel.

At block 616, all search categories weights are adjusted via a re-ranking processor. In an example, the re-ranking processor may utilize the adjust weights from the user weight preferences, the adjusted search results, the browsing history, and the tracked time to adjust all search categories even the search categories not associated with the different inputs. At block 618, the adjusted weights are applied via a search settings processor and the adjust weights are stored in a persistence data store.

Figure 7:
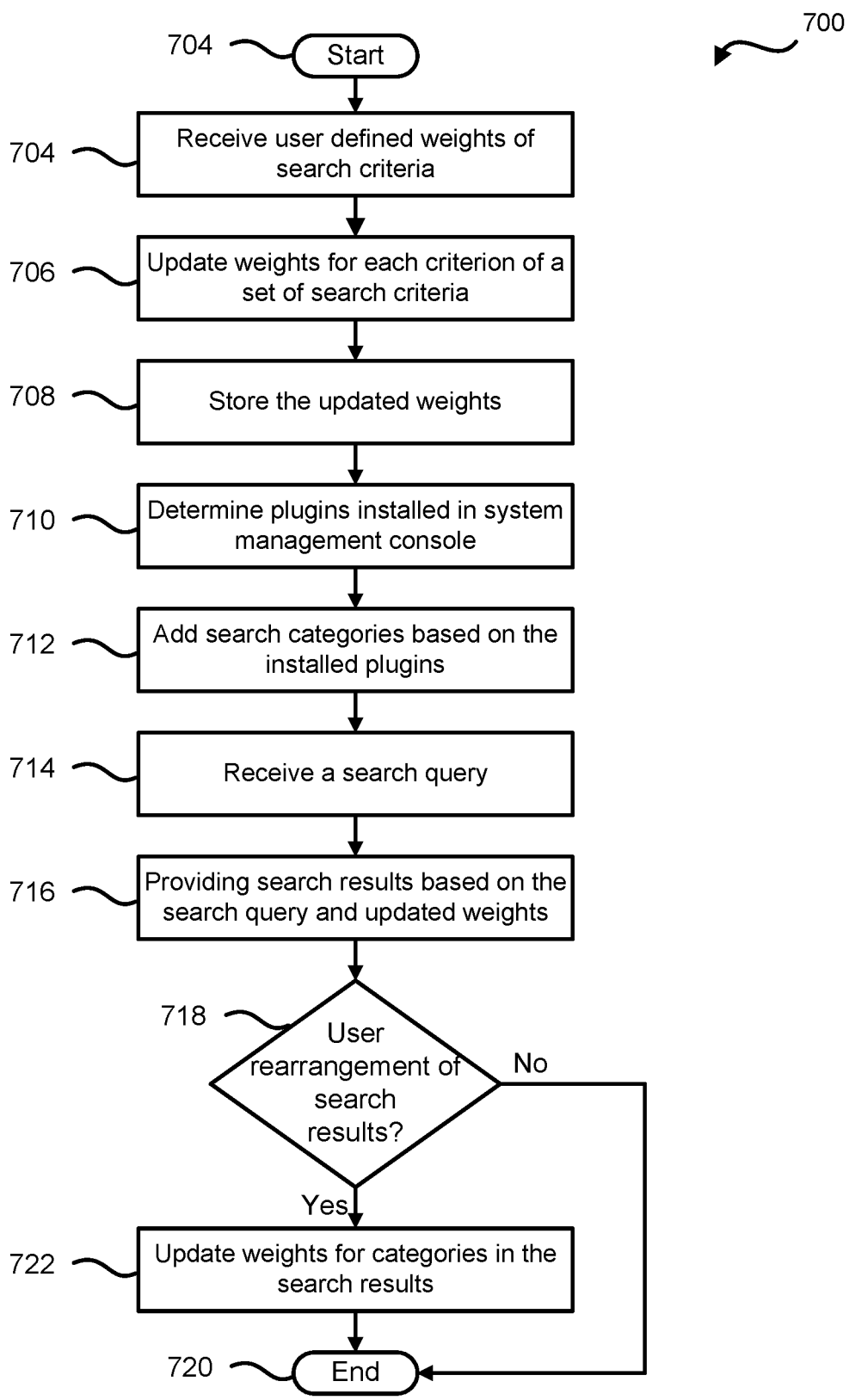
FIG. 7 is a flow diagram of a method for dynamically updating system management searches according to at least one embodiment of the present disclosure.

FIG. 7 illustrates a flow diagram of a method 700 for dynamically updating system management searches according to at least one embodiment of the present disclosure, starting at block 702. It will be readily appreciated that not every method step set forth in this flow diagram is always necessary, and that certain steps of the methods may be combined, performed simultaneously, in a different order, or perhaps omitted, without varying from the scope of the disclosure. FIG. 7 may be employed in whole, or in part, the components of controller module 202 of FIG. 2, the components of system management console 500 of FIG. 5, or any other type of system, controller, device, module, processor, or any combination thereof, operable to employ all, or portions of, the method of FIG. 7.

At block 704, user defined weights of search criteria are received. In an example, the search criteria include, but are not limited to, search categories, tags or groups of devices, and search sub-categories. At block 706, a weight for each criterion of a set of search criteria is updated. In an example, all weights may be updated even if the received user defined weights are only associated with a particular set of search criteria.

At block 708, the updated weights are stored. In an example, the updated weight may be stored in any suitable memory device, such as a settings data store memory. At block 710, plugins installed in the system management console are determined. In an example, the installed plugins may provide additional data or information to be utilized by a user of the system management console. At block 712, search categories are added based on the installed plugins. In certain examples, the added search categories may enable the data for the installed plugins to be provided to the user.

At block 714, a search query is received. At block 716, search results are provided based on the search query and the updated weights. In an example, the search results may include data associated with components managed by the system management console. At block 718, a determination is made whether the user rearranged the search results. If the user does not rearrange the search result the flow ends at block 720. If the user does rearrange the search results, weights for the categories in the search results are updated at block 722, and the flow ends at block 720. In an example, the weights are updated based on the new order of the search results after the rearrangement by the user.

While the computer-readable medium 136 of information handling system 100 is shown in FIG. 1 to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a first memory to store user settings for performing a search in a system management console;
   a second memory to store data associated with components of the system management console; and
   a processor to communicate with the first memory and with the second memory, the processor to:
   receive a plurality of user defined weights, wherein each of the user defined weights is associated with a different search criterion of a plurality of search criteria, wherein the user defined weights are received based on a movement of a search category to a new location in a search category list;
based on the received user defined weights, update weights for each of the search criteria;
increase weights for devices that are tagged as cluster devices;
store the updated weights for each of the search criteria and the increased weights for the devices in the user settings of the first memory;
receive a search query;
determine a percentage of devices in a particular group of devices that the user has a management domain over;
search based on the search query only the percentage of devices in the particular group of devices that the user has the management domain over;
provide search results based on the search query and the updated weights for each of the search criteria, wherein the search results include data from the second memory;
determine a user arrangement of the search results, wherein the user arrangement of the search results includes the search results being placed in an order that best describes the intent of the search during the browsing session;
based on the order of the search result created by the user arrangement of the search results, create search result weights for categories in the search results;
detect an end of the browsing session; and
in response to the end of the browsing session:
 maintain the user defined weights; and
 remove the search result weights from the first memory.

2. The information handling system of claim 1, wherein the processor further to:
detect a user login to a browsing session via the system management console;
determine webpages visited during the browsing session;
determine an amount of time spent viewing each visited webpage during the browsing session; and
create updated weights for each of the search criteria based on the webpages visited and the amount of time spent viewing each visited webpage; and
replace current weights with the updated weights in the first memory.

3. The information handling system of claim 1, wherein the processor further to:
determine one or more plugins installed within the system management console; and
add one or more search categories for the data to be searched during the search query, wherein the added search categories are based on the installed plugins.

4. The information handling system of claim 1, wherein the search results are further based on a role of the user providing the search query.

5. The information handling system of claim 1, wherein the search results are further based on a scope of the user providing the search query.

6. The information handling system of claim 1, wherein the search criteria includes a plurality of categories of data and a plurality of tags associated with the data.

7. A method comprising:
receiving, by a processor of a system management console in an information handling system, a plurality of user defined weights, wherein each of the user defined weights is associated with a different search criterion of a plurality of search criteria, wherein the user defined weights are received based on a movement of a search category to a new location in a search category list;
based on the received user defined weights, updating weights for each of the search criteria;
increasing weights for devices that are tagged as cluster devices;
storing, by the processor, the updated weights for each of the search criteria and the increased weights for the devices in user settings of a first memory of the information handling system;
receiving a search query;
determining a percentage of devices in a particular group of devices that the user has a management domain over;
searching based on the search query only the percentage of devices in the particular group of devices that the user has the management domain over;
providing search results based on the search query and the updated weights for each of the search criteria, wherein the search results include data from a second memory of the information handling system;
determining a user arrangement of the search results, wherein the user arrangement of the search results includes the search results being placed in an order that best describes the intent of the search during the browsing session;
based on the order of the search result created by the user arrangement of the search results, creating search result weights for categories in the search results;
detecting an end of the browsing session; and
in response to the end of the browsing session:
 maintaining the user defined weights; and
 removing the search result weights from the first memory.

8. The method of claim 7, further comprising:
detecting a user login to a browsing session via the system management console;
determining webpages visited during the browsing session;
determining an amount of time spent viewing each visited webpage during the browsing session; and
creating session weights for each of the search criteria based on the webpages visited and the amount of time spent viewing each visited webpage; and
replacing current weights with the session weights in the first memory.

9. The method of claim 7, further comprising:
determining one or more plugins installed within the system management console; and
adding one or more search categories for the data to be search during the search query, wherein the added search categories are based on the installed plugins.

10. The method of claim 7, wherein the search results are further based on a role of the user providing the search query.

11. The method of claim 7, wherein the search results are further based on a scope of the user providing the search query.

12. The method of claim 11, wherein the search criteria includes a plurality of categories of data and a plurality of tags associated with the data.

13. A method comprising:
receiving, by a processor of a system management console in an information handling system, a plurality of user defined weights, wherein each of the user defined weights is associated with a different search criterion of a plurality of search criteria, wherein the user defined weights are received based on a movement of a search category to a new location in a search category list;

based on the received user defined weights, updating weights for each of the search criteria;

increasing weights for devices that are tagged as cluster devices;

storing, by the processor, the updated weights for each of the search criteria and the increased weights for the devices in user settings of a first memory of the information handling system;

determining one or more plugins installed within the system management console;

adding one or more search categories for the data to be search during the search query, wherein the added search categories are based on the installed plugins;

receiving a search query;

determining a percentage of devices in a particular group of devices that the user has a management domain over;

searching based on the search query only the percentage of devices in the particular group of devices that the user has the management domain over;

providing search results based on the search query and the updated weights for each of the search criteria, wherein the search results include data from a second memory of the information handling system;

determining a user arrangement of the search results, wherein the user arrangement of the search results includes the search results being placed in an order that best describes the intent of the search during the browsing session;

updating the weights for categories in the search results based on the order of the search result created by the user arrangement of the search results; and in response to an end of the browsing session:
  maintaining the user defined weights; and
  removing the search result weights from the first memory.

14. The method of claim 13, further comprising:

detecting a user login to a browsing session via the system management console;

determining webpages visited during the browsing session;

determining an amount of time spent viewing each visited webpage during the browsing session; and creating session weights for each of the search criteria based on the webpages visited and the amount of time spent viewing each visited webpage; and replacing current weights with the session weights in the first memory.

15. The method of claim 13, wherein the search criteria includes a plurality of categories of data and a plurality of tags associated with the data.

* * * * *